United States Patent [19]

Jahnke

[11] 3,893,237
[45] July 8, 1975

[54] POULTRY CUTTER
[76] Inventor: Donald E. Jahnke, 6116 N. 115th St., Menomonee Falls, Wis. 53051
[22] Filed: Aug. 3, 1973
[21] Appl. No.: 385,437

[52] U.S. Cl. ............... 30/228; 30/180; 30/187; 30/245
[51] Int. Cl. ............................. B26b 15/00
[58] Field of Search ......... 30/228, 180, 272 R, 187, 30/245

[56] References Cited
UNITED STATES PATENTS

| | | | |
|---|---|---|---|
| 728,068 | 5/1903 | Young | 30/228 |
| 1,275,659 | 8/1918 | Cartwright | 30/180 |
| 2,366,909 | 1/1945 | Johnson | 30/228 |
| 2,446,011 | 7/1948 | Johnson et al. | 30/228 X |
| 2,488,224 | 11/1949 | Mothorn | 30/228 X |
| 2,493,696 | 1/1950 | Potstada | 30/228 |
| 2,504,405 | 4/1950 | Fletcher | 30/228 X |
| 3,115,667 | 12/1963 | Lis et al. | 17/11 |
| 3,165,780 | 1/1965 | Kellersman et al. | 17/11 X |
| 3,177,583 | 4/1965 | Fischer et al. | 30/228 X |
| 3,255,525 | 6/1966 | Frenzel | 30/228 X |

Primary Examiner—Al Lawrence Smith
Assistant Examiner—J. T. Zatarga
Attorney, Agent, or Firm—Ronald E. Barry

[57] ABSTRACT

A poultry cutter having a pair of cutter blades pivotally mounted on a housing and operated by a pneumatic piston and cylinder assembly which is assembled as an integral part of the housing. The piston and cylinder assembly is operated by a trigger actuated control mechanism mounted in the housing in a position to be actuated by the forefinger of the operator when holding the cylinder of the piston and cylinder assembly. The trigger actuated mechanism is provided with a guard to prevent accidental actuation of the poultry cutter.

3 Claims, 4 Drawing Figures

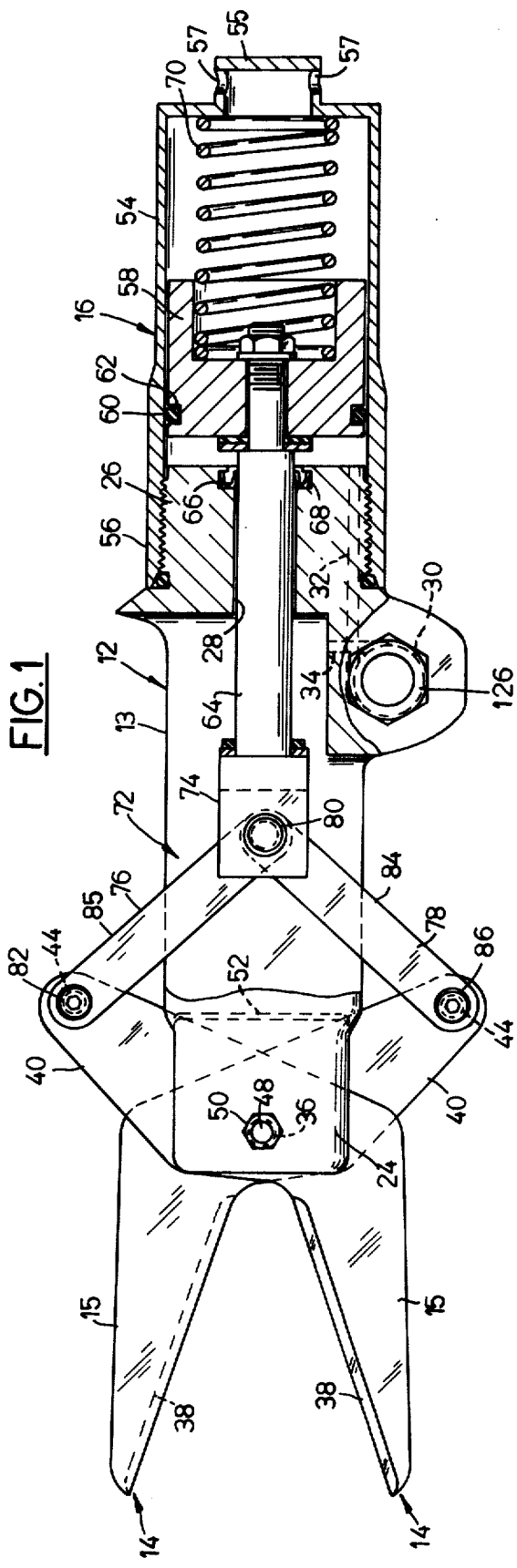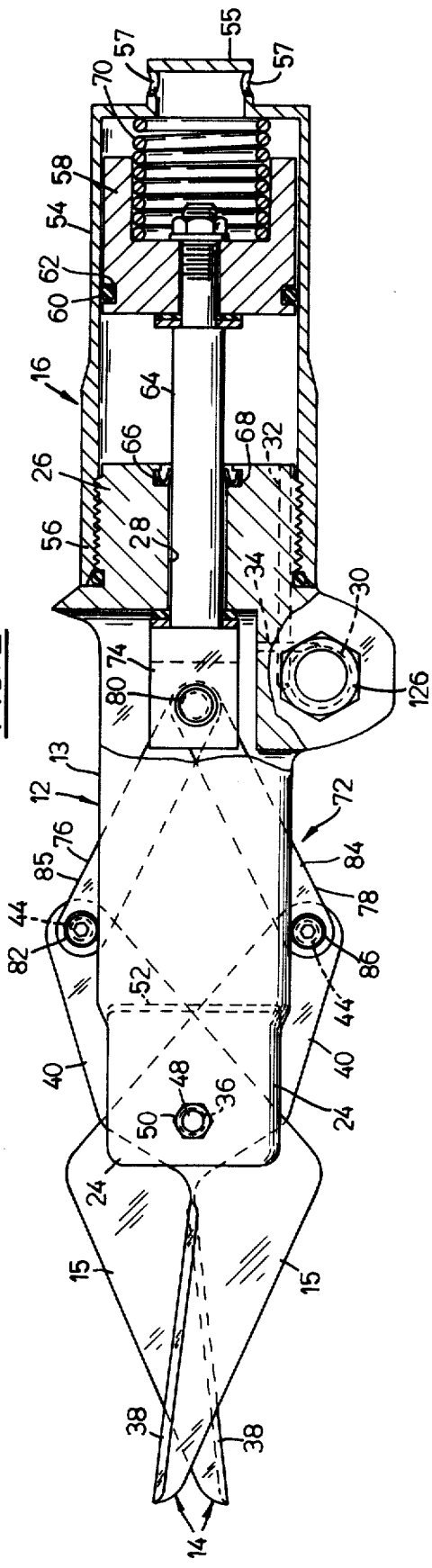

POULTRY CUTTER

BACKGROUND OF THE INVENTION

The copending application Ser. No. 347,180, filed Apr. 2, 1973, and entitled "Poultry Cutter" is also used for cutting poultry bones. This cutter, while it has proven successful, was developed for cutting larger type bones. However, the weight of this cutter made it difficult for operators to handle over long periods of time due to operator fatigue. This cutter was operated on a push principal which required the bias spring for the piston to be located internally of the piston within the cylinder. In the event of a failure, the piston and cylinder assembly had to be completely disassembled in order to replace the spring.

SUMMARY OF THE INVENTION

The poultry cutter of the present invention provides a lightweight type cutter which can be readily handled by the operator without causing operator fatigue. The down time for servicing the cutter has been reduced by placing the piston spring in a position where it can be replaced by merely removing the cylinder from the cutter. The cutter can be supported by the operator by holding the piston cylinder in the palm of the hand with the trigger located in a position to be engaged by the forefinger. Accidental actuation of the cutter is prevented by a guard located around the trigger. In this regard, the trigger requires less than an eighth of an inch of movement in order to close the knives and any inadvertent or accidental engagement of the trigger could actuate the cutter.

DRAWINGS

FIG. 1 is a top view partly in section of the poultry cutter showing the connection of the piston and cylinder assembly to the cutter blades;

FIG. 2 is a view similar to FIG. 1 showing the cutter blades in the actuated position;

DESCRIPTION OF THE INVENTION

Figure 3:
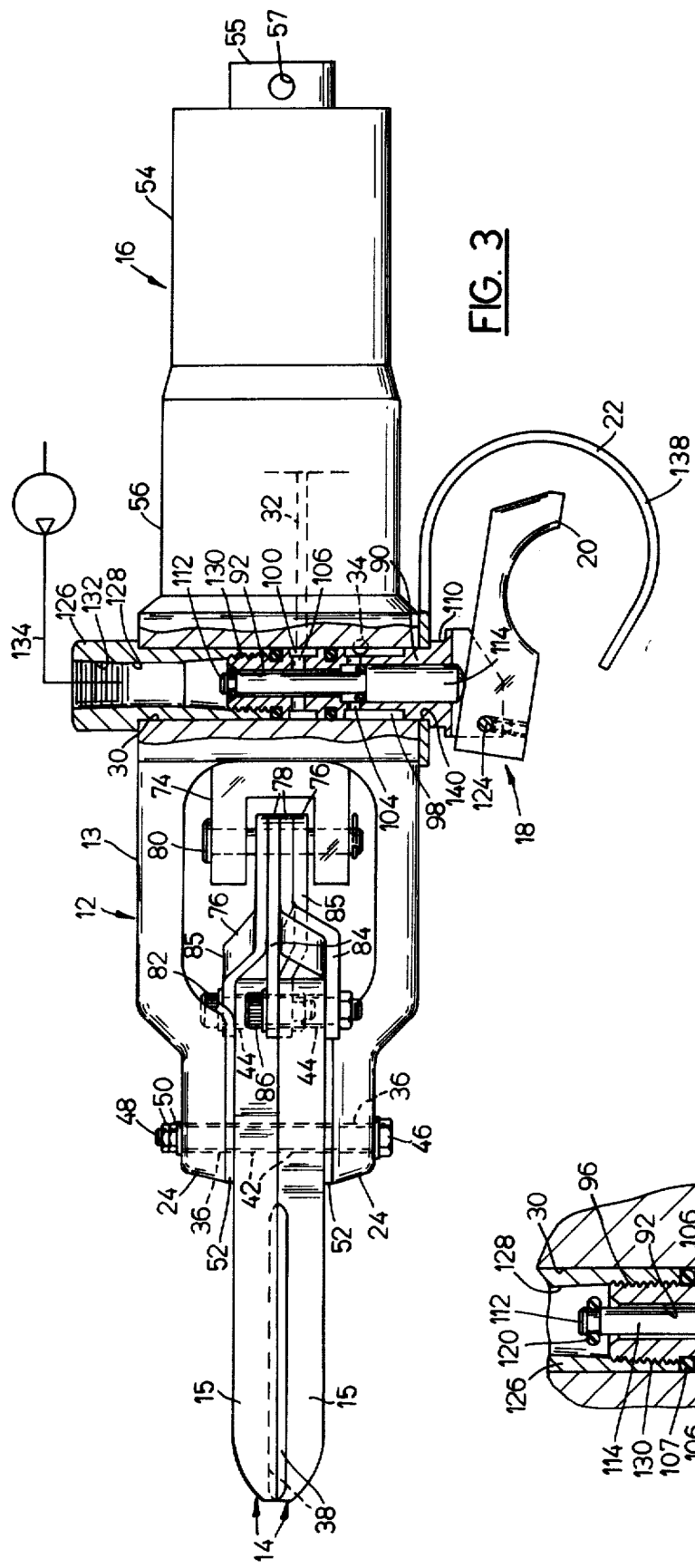
FIG. 3 is a side view in elevation with the housing partly broken away to show the trigger mechanism.
Figure 4:
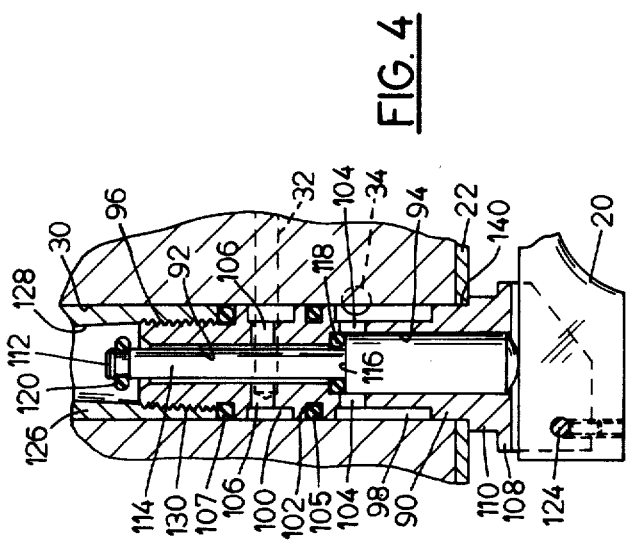
FIG. 4 is an enlarged view of the trigger mechanism.

The improved poultry cutter of this invention generally includes a housing 12 having a pair of cutter blades 14 pivotally mounted on the housing. A piston and cylinder assembly 16 is mounted on the housing and is operatively connected to the blades 14 to provide cutting motion. The piston and cylinder assembly 16 is pressurized by means of a trigger actuated control mechanism 18 mounted in the housing to control the flow of air under pressure to the piston and cylinder assembly 16. The trigger actuated mechanism 18 includes a trigger 20 which is positioned in close proximity to the piston and cylinder assembly 16 so that the operator can hold the piston cylinder in one hand and operate the trigger 20 with the forefinger of the same hand. Accidental actuation of the trigger 20 is prevented by means of a trigger guard 22.

More particularly, the housing 12 includes a central body portion 13 having a pair of arms 24 at one end and a threaded section 26 at the other end. An axial bore 28 and an open ended passage 30 are provided in the body portion 13 with the passage 30 offset from and transverse to the bore 28. The passage 30 is connected to a pressure passage 32 in the threaded section 26 of the housing and to a discharge passage 34 provided in the body portion 13. Coaxial holes 36 are provided at the ends of the arms 24.

The cutter blades 14 are identical, each including a main section 15 having a straight cutting edge 38 and a rearwardly extending actuating arm 40. A pivot pin hole 42 is located in each of the main sections 15 and a connecting hole 44 is provided at the end of each of the arms 40.

The cutter blades 14 are supported for pivotal motion between the arms 24 of the housing by means of a common pivot pin 46 having a threaded section 48 at one end. A pair of lock nuts 50 are provided on the threaded end 48 of the pin 46 to hold the pin in the hole 42 at the end of arms 24. A pair of bearing shoes or plates 52 are provided between the cutter blades and the arms 24 to minimize wear.

Piston and Cylinder Assembly

The piston and cylinder assembly 16 includes a cylinder 54 which is closed at one end by means of a cap 55 and includes an internal threaded section 56 at the other end. Air is admitted into the cylinder 54 through the pressure passage 32. The cap 55 provided at the closed end of the cylinder 54 includes a pair of holes 57 coaxially arranged in the sidewalls of the cap 55. The cylinder 54 is mounted on the threaded section 26 by inserting a rod or nail through the holes 57 and turning the threaded section 56 onto the section 26.

A piston 58 is positioned within the cylinder 54 and is sealed therein by means of an O-ring 60 provided in an annular groove 62 on the outer surface of the piston 58. A piston rod 64 is connected to the piston 58 and extends outwardly from the cylinder through the bore 28. A shaft seal 66 is provided in an annular groove 68 in the bore 28 in a position to engage the piston rod 64. The piston 58 is biased by means of a spring 70 toward the threaded section 26 of the housing 12. The piston 58 is actuated by admitting air under pressure into the cylinder 54 through passage 32.

The piston rod 64 is connected to the cutter blades by means of a linkage assembly 72 which includes a clevis 74 provided on the end of the piston rod 64. The clevis 74 is connected to the cutter blades by links 76 and 78. In this regard, the link 76 includes a pair of arms 85 which are connected to the clevis 74 by means of a bolt 80 and to the actuating arm 40 for one of the cutter blades 14 by means of a pin 82. The link 78 includes a pair of arms 84 connected to the bolt 80 and to each side of the actuating arm 40 for the other cutter blade 14 by means of a pin 86. The cutter blades 14 are opened by moving the piston away from the threaded section 26 on the body portion 13.

Trigger Control Assembly

Means are provided for actuating the piston and cylinder assembly 16 to open and close the blades 14. Such means is in the form of the trigger actuated control mechanism 18 which is positioned within the passage 30 in the housing 12. In this regard, the trigger mechanism 18 includes a valve housing 90 having an axial passage 92. An enlarged bore 94 is provided at one end of the passage 92 and a threaded section 96 is provided on the outside surface of the opposite end of the valve housing 90. The valve housing 90 is provided with annular recesses 98 and 100 on each side of the annular groove 102. The recess 98 is connected to the axial passage 92 by means of ports 104. The recess 100 is connected to the passage 92 by ports 106.

Means are provided for sealing the valve housing 90 in the passage 30 with the recess 100 in communication with pressure passage 32. Such means is in the form of O-ring seals 105 and 107. O-ring seal 105 is positioned in groove 102 and seal 107 is positioned on threaded section 96.

A trigger mounting bracket 108 is provided at one end of the valve housing 90 adjacent to the enlarged bore 94. A flange 110 having a diameter slightly smaller than the diameter of the valve housing 90 is provided at the junction of the bracket 108 with the housing 90.

The flow of air through the passage 92 is controlled by means of a valve pin 112 having a reduced diameter section 114 which has a diameter smaller than the diameter of the passage 92. The reduced diameter section 114 terminates at a shoulder 116 and is positioned within the passage 92 with the shoulder 116 in a position to abut against the end of the bore 94. The reduced diameter section 114 is slightly longer than the passage 92. The passage 92 is closed or blocked by means of O-ring seals 118 and 120. In this regard, the O-ring 118 is positioned at the shoulder 116 and the O-ring seal 120 is positioned on the outer end of the reduced diameter section 114. When the seal 118 is brought into abutting engagement with the end of the bore 94, air can flow through the inlet end of passage 92 and out through the ports 106. When the seal 120 is moved into engagement with the inlet end of the bore 92, air is free to flow back through the ports 106 into the passage 92 and out through the ports 104.

The valve pin 112 is selectively moved between an open and closed position by means of a trigger 20. The trigger is pivotally mounted on the bracket 108 by means of a pin 124 and is pivotable into engagement with the end of the valve pin 112.

The valve housing 90 is positioned within the passage 30 in the housing 12 and is retained therein by means of an air coupling member 126. The coupling member 126 includes an axial passage 128 having an internally threaded section 130 at the inner end which is adapted to engage the threaded section 96 on the valve housing 90. A threaded section 132 is also provided at the other end of the coupling member 126 for connection to an air pressure line or hose 134. The air coupling member 126 is used to draw the valve housing 90 into passage 30 far enough for the recess 100 to be in communication with passage 32.

When air under pressure is admitted to the passage 128, the force of the air will act against the end of the valve pin 112 forcing the seal 120 against the end of the passage 92 preventing air flow to the piston and cylinder assembly. When the trigger 20 is pivoted against the end of the valve pin 112, the seal 118 will be moved into abutting engagement with the end of the bore 94 closing the passage 92 and opening the inlet end of the passage 92 so that air can flow into the passage 92 and out through port 106 into the space in annular recess 100 in the valve body between seals 105 and 107. Air trapped in the annular recess 100 will flow through the pressure passage 32 into the cylinder 54 moving the piston 58 to the right in the drawing to close the cutter blades 14. When the trigger 20 is released the air under pressure in passage 128 will again force the pin 112 into the valve body, closing the inlet end of the passage 92 and opening the outlet end of the passage 92. Air will flow through port 106 into passage 92 and out through port 104 to the discharge passage 34.

Trigger Guard

The trigger 20 is protected from accidental operation by means of a guard 22 which is in the form of a plate 138 made of spring steel. The plate 138 includes an opening 140 at one end which is adapted to be mounted on the valve housing 90 in abutting engagement with flange 110. The major portion of plate 138 is bent to form a loop around the trigger 20. With the guard in position, the trigger can only be actuated when the cylinder 54 is held in the hand of the operator with the forefinger on the trigger 20. A slight squeeze of the trigger 20 will produce sufficient movement of the valve pin 112 to open passage 92 and pressurize the piston and cylinder assembly.

This poultry cutter has been reduced considerably in size and weight so that it can be suspended from the air hose 134 which is connected to the valve and coupling 90. In some installations it may be preferable to support the poultry cutter on a retractable type line so that the weight of the cutter is not carried by the operator.

I claim:

1. An improved hand held poultry cutter comprising:

a housing having a pair of arms, a pressure passage extending through said housing transversely to said arms, a pair of cutter blades pivotally mounted on said arms on one side of said pressure passage, said blades having straight cutting edges and rearwardly extending arms, a pneumatic piston and cylinder assembly mounted on said housing on the other side of said pressure passage, said assembly including a piston rod, linkage means for operably connecting said piston rod to said rearwardly extending arms, means for biasing said piston rod to hold the blades in an open position, a trigger actuated air control mechanism located in said pressure passage for selectively pressurizing said piston and cylinder assembly to close said blades, said trigger actuated air control mechanism including an air valve body having an axial passage, means for connecting one end of said axial passage to a source of air under pressure, port means for connecting said axial passage to said cylinder, an air valve plunger positioned in said axial passage in said body and including an O-ring on each end of said plunger for selectively sealing one or the other of the ends of said axial passage whereby said port means is connected to said air under pressure or vented to atmosphere, said plunger being moved to a closed position by the pressure of the air at said one end of said axial passage, a trigger pivotally mounted on said housing in a position to move said plunger to an open position with respect to said one end of said axial passage to pressurize said piston and cylinder assembly and to close the other end of said axial passage, said trigger being located in a position to be actuated when the cutter is held by the cylinder assembly, and a guard for preventing accidental actuation of said trigger actuated mechanism.

2. The cutter according to claim 1 wherein said pneumatic piston and cylinder assembly includes a cylinder mounted on said housing and a piston mounted within said cylinder and being connected to said piston rod, said linkage means including a pair of links and said biasing means including a spring within said cylinder biasing said piston rod to a position to hold said blades in an open position.

3. The cutter according to claim 1 wherein said guard comprises an arcuate plate mounted on said mechanism and encircling said trigger.

* * * * *